United States Patent Office 3,478,075
Patented Nov. 11, 1969

3,478,075
TERPOLYMERS CONTAINING POLYSILOXANE, POLYOXYALKYLENE, AND POLYVINYL ESTER BLOCKS
James Jack, Troon, Ronald Sangster Stuart, Saltcoats, and John Beckett Plumb, West Kilbride, Scotland, assignors to Imperial Chemical Industries Limited, London, England, a corporation of Great Britain
No Drawing. Filed Dec. 20, 1965, Ser. No. 515,212
Claims priority, application Great Britain, Dec. 29, 1964, 52,652/64
Int. Cl. C07f 7/08; C08g 47/02; B01f 17/00
U.S. Cl. 260—448.2         39 Claims

ABSTRACT OF THE DISCLOSURE

A new and useful class of terpolymers which comprises at least one polysiloxane block, at least one polyoxyalkylene block and at least one block selected from polyvinyl ester and, partially and wholly hydrolysed polyvinyl esters. The novel terpolymers are useful as surfactants or cell control agents in polyurethane foam systems.

---

This invention relates to new polymers and more particularly to new terpolymers.

A wide variety of polymers based on organopolysiloxanes either alone or modified by reaction with other polymers are known and are readily available. Thus, for example, one particularly useful class of such materials consists of polysiloxane/polyoxyalkylene copolymers.

According to the present invention a new and useful class of terpolymers comprises at least one polysiloxane block, at least one polyoxyalkylene block and at least one block selected from polyvinyl ester, partially and wholly hydrolysed polyvinyl esters.

The polyoxyalkylene blocks in our terpolymers may be linear or branched and are of general formula $(OC_nH_{2n})_x$, where $x$ is a positive integer, preferably at least 5, and $n$ is an integer from 1 to 5, preferably 2 to 4. It is also further preferred that not less than 25 percent of the oxyalkylene units should have $n=2$. It is, of course, possible and in some cases may be desirable that $n$ should have different values in the same block. Alkylene groups which may be present include, for example, ethylene, 1,2-propylene, 1,3-propylene, 1,2-butylene and 1,4-butylene. Both ends of the polyoxyalkylene blocks may either be attached to a polysiloxane block, alternatively one may be of the form OR where R is a hydrogen atom or a monovalent hydrocarbon or substituted hydrocarbon group, or COR' where R' is a monovalent hydrocarbon group such as an alkyl group, for example, butyl or octyl group.

The polyoxyalkylene blocks may be derived from polyoxyalkylene polymers prepared in known manner. Polyoxyalkylene polymers suitable for this purpose include, for example, those containing an hydroxyl group, or an alkenyl or other reactive group capable of reacting with a reactive polysiloxane to give a polysiloxane/polyoxyalkylene copolymer either directly or after further treatment.

Linear hydroxyl-containing polyoxyalkylene polymers may be prepared, for example, by the polymerisation of an alkylene oxide in the presence of a basic catalyst, such as potassium hydroxide, and of a glycol or a primary mono-amine. Alternatively branched hydroxyl-containing polymers may be prepared by the polymerisation of an alkylene oxide in the presence of a basic catalyst and of a substance having more than two active hydrogen atoms per molecule, for example, ammonia and polyhydroxy compounds such as glycerol, hexanetriols, trimethylolethane, trimethylolpropane, triethanolamine, pentaerythritol, sorbitol, sucrose and phenol-formaldehyde reaction products, amino-alcohols such as mono-ethanolamine and diethanolamine and polyamines such as ethylene diamine, hexamethylene diamine, diethylene triamine, tolylene diamine and diaminodiphenylmethane.

Polyoxyalkylene polymers containing unsaturated groups may be prepared, for example, by reaction of alkylene oxides with unsaturated alcohols, unsaturated ethers or esters of diols or polyols having one or more free hydroxyl groups or from hydroxyl-containing polyoxyalkylene polymers by conversion to unsaturated ethers or esters by known methods.

The polysiloxane block or blocks may be formed from linear, branched or cyclic organopolysiloxanes. The organo groups therein are hydrocarbyl or substituted hydrocarbyl groups, for example, such as methyl, ethyl, propyl, butyl, phenyl, tolyl, naphthyl, cyclohexyl, vinyl, allyl and phenylethyl groups and groups derived therefrom by substitution with halogens such as chlorine or bromine or with cyano, carboxy or amino groups. For many purposes it is, however, preferred that the organo groups be methyl groups. The polysiloxane block or blocks are linked to a polyoxyalkylene block or blocks. The linkage may be, for example,

where R'' is a divalent hydrocarbon group,

for example,

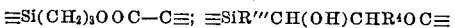

where R''' is a divalent hydrocarbon or ether group and $R^4$ is an alkyl group; ≡SiR''NHCOOC, for example

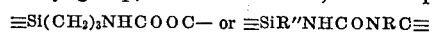

where R is hydrogen or a monovalent hydrocarbon group, for example ≡Si(CH$_2$)$_3$NHCON(CH$_3$)C≡ such as are formed by known methods.

The polyvinyl ester block or blocks, each of which is attached to a polyoxyalkylene block, may be a polyvinyl acetate, propionate, butyrate, caprate and other polyvinyl ester or mixed ester. In the case of the wholly or partially hydrolysed products these may be derived from any suitable polyvinyl ester by hydrolysis or alcoholysis. Normally the preferred ester is polyvinyl acetate.

In preparing the terpolymers of our invention the polyvinyl ester blocks are grafted to polyoxyalkylene blocks which may or may not, already be attached to a polysiloxane block. This may be accomplished by heating a polyoxyalkylene polymer or polysiloxane/polyoxyalkylene copolymer with a vinyl ester in presence of a free radical producing catalyst, such as a peroxide, for example, a diacyl or diaroyl peroxide, particularly dibenzoyl peroxide or an azo compound, particularly αα'-azo-bis-isobutyronitrile in the manner described by Kahrs and Zimmermann (Makromolekulare Chemie 1962, 58, 75). If the starting polyoxyalkylene blocks were not atatched to a polysiloxane block this attachment may be formed subsequent to the grafting.

In one method of producting our terpolymers a polysiloxane containing a proportion of silicon-bonded hydrogen atoms is reacted with a polyoxyalkylene/polyvinyl ester graft copolymer containing at least one hydroxyl group preferably in the polyoxyalkylene portion. The proportions of the two reactants may vary widely, but if, as is the case for some applications, it is desired to have no silicon-bonded hydrogen atoms in the final product a small excess of the graft copolymer is used.

This reaction may be carried out over a wide range of temperatures, for example, from 20 to 150° C. It is also usually conveniently carried out in presence of an aromatic hydrocarbon solvent. Suitable solvents include, for example, benzene, toluene and xylene. The reaction is normally continued until substantially complete, for example, as measured by the quantity of hydrogen evolved.

It is also preferred that the reaction be carried out in presence of a catalyst of the kind hitherto used for reactions of this kind, for example, bases, acids, Friedel-Crafts halides and metallic salts and complexes. Suitable catalysts include, for example, metal salts soluble in the reaction medium such as carboxylic acid salts of divalent tin or lead or a dialkyl tin acylate such as stannous octoate, lead octoate and dibutyl tin dilaurate.

In another method of forming our terpolymers a polysiloxane containing at least one silicon-bonded halogen atom is reacted with a hydroxyl-containing polyoxyalkylene/polyvinyl ester graft copolymer. The proportions of the reactants may, of course, vary widely but it is normally preferred that the final product should not contain any silicon-bonded halogen atoms.

This reaction is, preferably, carried out in presence of a hydrogen halide acceptor which may be a liquid or solid, for example, an amine particularly a tertiary amine such as pyridine or triethylamine or a urea such as urea or thio-urea. The amine hydrogen halide is normally removed from the reaction mixture by filtration.

The reaction is also preferably carried out in presence of a solvent such as a hydrocarbon or chlorinated hydrocarbon. Aromatic hydrocarbons are normally preferred. Suitable solvents include, for example, benzene, toluene and xylene.

This reaction may also be carried out over a wide range of temperatures, for example, from 20 to 150° C.

In still another method of forming our terpolymers a polysiloxane containing silicon-bonded alkoxy or aroxy groups is reacted with an hydroxyl-containing polyoxyalkylene/polyvinyl ester graft copolymer. This reaction may be carried out in the manner described for reactions of such polysiloxanes with hydroxyl-containing polyoxyalkylene polymers. The alcohol formed in this reaction is normally removed. This reaction may be catalysed by a basic or acidic catalyst, for example, a strong organic acid such trifluoroacetic acid, preferably in the presence of an alkali metal salt thereof.

In two preferred types of the terpolymers of our invention a polysiloxane portion is linked to a polyoxyalkylene portion by a divalent organic group for example, a —(CH$_2$)$_n$—, or —(CH$_2$)$_{n-1}$CO— group where $n$ is an integer from 1 to 20, preferably from 3 to 10. Such a linkage is hydrolytically stable. These kinds of terpolymer may be obtained by reacting a polysiloxane containing at least one reactive group with a polyoxyalkylene/polyvinyl ester graft copolymer containing at least one hydroxyl group, preferably in the polyoxyalkylene portion. In one method of producing such terpolymers a polysiloxane having one or more ≡SiR″X groups, where R″ is a divalent hydrocarbon group and X is a halogen atom, is reacted with an alkali metal salt of an hydroxyl-containing polyoxyalkylene/polyvinyl ester graft copolymer. Alternatively, such terpolymers can be prepared by reaction of a polysiloxane containing one or more ≡SiR″COOR$^5$ or ≡SiR″COX groups where R$^5$ is a monovalent organic group, preferably a lower alkyl group, or hydrogen and R″ and X are as already stated, with an hydroxyl-containing graft polyoxyalkylene/polyvinyl ester copolymer in which the hydroxy groups are preferably attached to the polyoxyalkylene portion of the graft copolymer. A further method of preparing these terpolymers is to react a polysiloxane containing one or more silicon bonded hydrogen atoms with an unsaturated ester or ether derivative of a polyoxy alkylene/polyvinyl ester graft copolymer. In this method it is preferred that the unsaturated group be attached to the polyoxyalkylene portion. This method is also preferably carried out in presence of a solvent, for example, a hydrocarbon such as toluene or xylene or an ether such a dibutyl ether or diethylene glycol dimethyl ether. The proportions of reactants may, of course, vary widely but it is normally preferred that they be such that there are no silicon-bonded hydrogen atoms remaining in the final product. It is also normally preferred to use a catalyst, for example, metallic platinum, a platinum containing catalyst such as chloroplatinic acid an olefine complex of a platinous halide such as cyclohexene/platinous chloride, a sulphide complex of a platinous halide such as diethyl sulphide/platinous chloride or a platinum alcoholate.

Types of terpolymers having the linkage.

can be prepared by reacting a polyether or polyvinyl ester grafted polyether containing at least one —COOR or —COX group, where R is monovalent organic group, preferably a lower alkyl group, or hydrogen and X is a halogen atom, with an hydroxyorganopolysiloxane or with an unsaturated alcohol and thereafter reacting the product with an organopolysiloxane containing a proportion of silicon-bonded hydrogen atoms and if necessary thereafter grafting on a polyvinyl ester. These reactions may be illustrated thus:

(1) 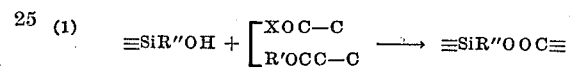

or (2)
(a) 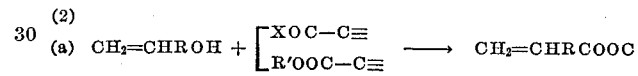

followed by (b) 

Types of terpolymers having the linkages

may be prepared by reacting an epoxy-containing organopolysiloxane with a polyether or grafted polyether and thereafter, if necessary, grafting on the polyvinyl ester portion. This may be illustrated thus

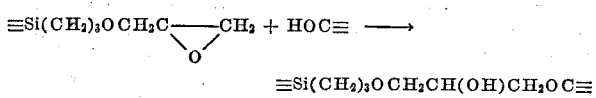

Terpolymers containing a urethane linkage

may be prepared by reacting a hydroxy-containing polyether or graft with an isocyanato substituted organopolysiloxane or with an unsaturated isocyanate followed by reaction with an organopolysiloxane containing silicon-bonded hydrogen, and, if necessary, by the grafting of the polyvinyl ester portion. This may be illustrated thus:

(1) ≡SiR″NCO+HOC≡→ ≡SiR″NHCOOC≡ or (2)(a) 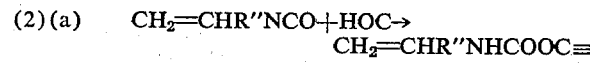

(b) 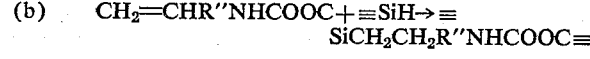

Terpolymers containing a urea linkage,

may be prepared by reacting an isocyanato substituted organopolysiloxane with a polyether or grafted polyether containing a primary or secondary amino group, and, if necessary, by grafting on of the polyvinyl portion. Alternatively, the amino polyether or grafted polyether may be reacted with an unsaturated isocyanate and the product thereafter reacted with an organopolysiloxane containing silicon-bonded hydrogen. This may be illustrated as follows:

(1) SiR″NCO+NHR′C≡ → ≡SiR″NHCONRC≡ or (2)(a) CH₂=CHR″NCO+R′NHC≡
       CH₂=CHRNHCONRC≡

(b) SiH+CH₂=CHR″NHCONRC≡→ ≡
    SiCH₂CH₂R″NHCONRC≡

Our terpolymers may also be formed by reacting a vinyl ester, for example, vinyl acetate with a preformed polysiloxane/polyoxyalkylene copolymer. Thus the vinyl ester containing an initiator dissolved therein may be added to the polysiloxane/polyoxyalkylene copolymer at a temperature of, for example, from 20 to 200° C. The optimum temperature will depend on the initiator used but it is normally preferred to be 75 to 150° C. If the initiator is benzoyl peroxide the preferred range is from 80 to 90° C. Suitable initiators are free radical producers such as peroxides, hydroperoxides and azo compounds, for example, benzoyl peroxide or α-bisisobutyronitrile. Any unreacted vinyl ester is removed from the product by distillation under reduced pressure after completion of the reaction.

The polysiloxane/polyoxyalkylene/polyvinyl alcohol terpolymers may be prepared by hydrolysis or alcoholysis of any of the polysiloxane/polyoxyalkylene/polyvinyl ester terpolymers. Normally it is preferred to use a lower alkanol such as methanol or ethanol. The reaction may be carried out in presence of an alkali metal alkoxide, for example, sodium methoxide or ethoxide in amounts of the order of 0.05 to 5 percent and preferably 0.1 to 1 percent by weight of the terpolymer. This method is similar to that described for the alcoholysis of polyoxyalkylene/polyvinyl ester graft copolymers by Kahrs and Zimmermann (loc. cit.).

The polysiloxane/polyoxyalkylene/polyvinyl ester terpolymers of our invention, especially terpolymers in which the polyoxyalkylene portion contains both oxyethylene and oxypropylene units, are useful surfactants or cell control agents in polyurethane foam systems.

The polysiloxane/polyoxyalkylene/polyvinyl alcohol terpolymers, some of which are soluble in water, are of value for imparting anti-stick properties to paper. For this purpose it is preferred to use terpolymers in which the polysiloxane and polyoxyalkylene blocks are joined to each other by hydrolytically stable linkages.

All of our terpolymers are valuable for the surface treatment of glass. Polysiloxane/polyoxyalkylene/polyvinyl ester and alcohol polymers are of special value in the form of solutions and can be used to treat glass, thus improving its scratch resistance and making it receptive to adhesives, for example, cellulose based adhesives such as starches. This is an advance over hitherto known polysiloxane products which tend to impart anti-stick properties to the treated glass, thus making it non-adherent. Glass thus treated also exhibits anti-misting characteristics. For these treatments it is preferred to use polymers in which the polysiloxane and polyoxyalkylene blocks are joined by hydrolytically stable linkages. The terpolymer products, especially the polyvinyl alcohol type, function as emulsifying agents especially for silicone fluids.

Our invention is further illustrated by the following examples in which all parts and percentages are by weight except where otherwise stated.

EXAMPLE 1

200 parts of a polyether prepared by oxyalkylation of n-butanol with a mixture containing equal proportions by weight of ethylene oxide and propylene oxide, and having an average molecular weight of 1620, were stirred and heated to 80° C. under nitrogen, whilst 50 parts of freshly distilled vinyl acetate containing 0.6 part dissolved dibenzoyl peroxide were added over a period of 30 minutes. Stirring and heating to 90 to 100° C. under reflux were then continued for 3 hours. The mixture was allowed to cool to 20° C. after which all matter volatile up to 100° C. at 0.1 mm. pressure was removed by distillation. There was thus obtained 245.3 parts of a homogeneous, clear, colourless oil, the infrared absorption spectrum of which showed the presence of C=O groups, but no C=C groups. The copolymer obtained in this way contained 18.6 percent grafted poly(vinyl acetate) and had a viscosity of 1060 cs. at 25° C. and $n_D^{22}$ 1.4588.

67.5 parts of the so-prepared poly(vinyl acetate) grafted oxyalkylated n-butanol were diluted with 100 parts of toluene and the mixture dried for 1 hour by azeotropic distillation with return of solvent to the mixture. 0.5 part of stannous octoate were then added, followed over a period of 15 minutes by 16 parts of a trimethylsilyl end-stopped polysiloxane fluid having on average 3 CH₃Si(H)O units and 15 (CH₃)₂SiO units per molecule. The mixture was heated under reflux until the theoretical amount of hydrogen had been evolved (5 hours) after which the solvent was removed by distillation at 15 mm. pressure up to a final temperature of 100° C. to give 83 parts of a slightly hazy, straw coloured oil of viscosity 4320 cs. at 25° C. The cloud point of a 20 percent solution of this product in distilled water was 35° C.

EXAMPLE 2

200 parts of a polyether prepared by oxyalkylation of iso-octanol with a mixture containing equal proportions by weight of ethylene oxide and propylene oxide, and having an average molecular weight of 1530 were stirred and heated to 80 to 85° C. under nitrogen whilst 22 parts of freshly distilled vinyl acetate containing 0.6 part dissolved dibenzoyl peroxide were added dropwise over a period of 30 minutes. Stirring and heating to 85 to 95° C. under reflux were continued for 3 hours. The mixture was allowed to cool to 20° C. after which all matter volatile up to 100° C. at 0.1 mm. pressure was removed by distillation. There was thus obtained 218.9 parts of a homogeneous, clear, colourless oil, which consisted of a polyether containing 8.6 percent grafted poly(vinyl acetate) and having a viscosity of 280 cs. at 25° C. and $n_D^{22}$ 1.4570.

67.5 parts of the so-prepared poly(vinyl acetate) grafted oxyalkylated iso-octanol were diluted with 100 parts of toluene and the mixture dried for 30 minutes by azeotropic distillation with return of solvent to the mixture. 0.5 part of stannous octoate was then added, followed over a period of 15 minutes by 19.3 parts of the trimethylsilyl end-stopped polysiloxane fluid used in Example 1. The mixture was heated under reflux until the theoretical amount of hydrogen had been evolved (5 hours) after which the solvent was removed by distillation at 15 mm. pressure up to a final temperature of 100° C. to give 86.5 parts of a clear straw coloured oil of viscosity 1259 cs. at 25° C. and cloud point 26.5° C. (20% solution in distilled water).

EXAMPLE 3

150 parts of a solid poly(ethylene glycol) of average molecular weight 1500 was melted, by heating to 85 to 95° C., and whilst stirring and heating to this temperature under nitrogen 50 parts of freshly distilled vinyl acetate containing 0.6 part of dissolved dibenzoyl peroxide were added over a period of 45 minutes. The mixture was then stirred and heated under reflux to 100 to 110° C. for 3 hours after which it was allowed to cool to 20° C. The waxy solid so obtained was re-melted, and residual material volatile at 100° C. at 0.1 mm. pressure removed by distillation and in this way 7 parts of unreacted vinyl acetate were recovered. There remained 193.3 parts of a homogeneous, clear, colourless oil, which solidified to a white waxy solid on cooling to 40 to 44° C. and which contained 22.4 percent of grafted poly(vinyl acetate).

21.5 parts of the so-prepared solid poly(vinyl acetate) grafted poly(ethylene glycol) were dissolved in 35 parts of toluene, and the mixture dried for 30 minutes by azeotropic distillation with return of solvent to the mixture. 0.18 part of stannous octoate was then added, followed over a period of 15 minutes by 7.5 parts of 1-hydroundecamethylpentasiloxane[Me$_3$Si(OSiMe$_2$)$_4$H]. The mixture was heated under reflux until the theoretical amount of hydrogen had been evolved (4 hours) after which the solvent was removed by distillation at 15 mm. pressure at 100° C. to give 28.7 parts of a material which was a waxy solid at 20° C. with cloud point 64.5° C. (20% solution in distilled water).

EXAMPLE 4

300 parts of a mixture of equal parts of the polyethers used in Examples 1 and 2 were stirred and heated to 80 to 85° C. under nitrogen whilst 75 parts of freshly distilled vinyl acetate containing 1 part of dibenzoyl peroxide were added over a period of one hour. Stirring and heating to 85 to 95° C. were continued for 5 hours, after which the mixture was allowed to cool to 20° C. Residual volatile material was then removed by distillation up to 100° C. at 0.1 mm. pressure, and there was thus obtained 363.2 parts of a homogeneous, clear, colourless oil of viscosity 786 cs. at 25° C. and $n_D^{22}$ 1.4588, which contained 17.4 percent of grafted poly(vinyl acetate).

100 parts of the so-prepared poly(vinyl acetate) grafted mixture of polyethers were diluted with 150 parts of toluene and the mixture dried for 30 minutes by azeotropic distillation with return of solvent to the mixture. 0.75 part of stannous octoate was then added followed over a period of 15 minutes by 25.7 parts of an Si—H terminated dimethylpolysiloxane of average composition MeSi[(OSiMe$_2$)$_5$OSiMe$_2$H]$_3$ The mixture was thereafter heated under reflux until the theoretical amount of hydrogen had been evolved (7 hours) after which the solvent was removed by distillation at 15 mm. pressure up to a final temperature of 100° C. to give 125 parts of a clear, straw coloured oil of viscosity 2244 cs. at 25° C. The cloud point of a 20% solution in distilled water was 31.5° C.

EXAMPLE 5

150 parts of a polysiloxane/polyoxyalkylene copolymer having average composition C$_2$H$_5$Si[(OSiMe$_2$)$_6$(OC$_2$H$_4$)$_{17}$(OC$_3$H$_6$)$_{13}$OC$_4$H$_9$]$_3$ were heated to 84° C. in an atmosphere of nitrogen. 50 parts of freshly distilled vinyl acetate containing 0.7 part of dissolved dibenzoyl peroxide were added dropwise with constant stirring over a period of one hour. The temperature of the reaction mixture increased to a maximum of 108° C. during the addition, and thereafter was maintained in the range 100 to 110° C. for 3 hours. The mixture was then allowed to cool to room temperature after which all matter volatile up to 130° C. at 0.1 mm. pressure was removed by distillation. In this way 4.1 parts of unreacted vinyl acetate were recovered and there were obtained 195.1 parts of a homogeneous, clear, colourless viscous oil which contained 23.1 percent of grafted poly(vinyl acetate).

EXAMPLE 6

200 parts of a polysiloxane/polyoxyalkylene copolymer of average composition

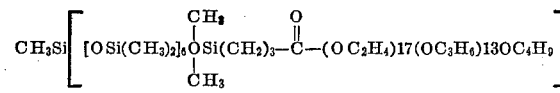

were heated to 85° C. in an atmosphere of nitrogen 64.8 parts of freshly distilled vinyl acetate containing 0.8 part dissolved dibenzoyl peroxide were then added thereto over a period of 1 hour whilst stirring continuously. When the addition was complete, the mixture was stirred and heated to 100° C. for 2 hours, then cooled to room temperature. Unreacted vinyl acetate was then removed by distillation at 100° C. at 0.1 mm. pressure. In this way there were obtained 232 parts of poly(vinyl acetate) grafted polysiloxane/polyoxyalkylene copolymer in the form of a homogeneous, clear, light straw coloured viscous oil which contained 13.8 percent grafted poly(vinyl acetate).

EXAMPLE 7

100 parts of the grafted copolymer prepared in the manner described in Example 6 were dissolved in 158 parts of anhydrous methanol, moisture being excluded, 3 parts of a 8.5 percent solution of sodium methoxide in methanol were added, the solution stirred for 4 hours at 35 to 42° C. then left to stand for 16 hours at 20 to 22° C. The mixture was then treated with 1.0 part of glacial acetic acid after which methyl acetate and methanol were distilled off, the last traces being removed under reduced pressure of 0.1 mm. at 100° C. In this way there were obtained 92.6 parts of poly(vinyl alcohol) grafted polysiloxane/polyoxyalkylene copolymer in the form of a pale brown, very viscous, water-soluble oil.

EXAMPLE 8

76 parts of poly(vinyl acetate) grafted polysiloxane/polyoxyalkylene copolymer prepared in the manner described in Example 6 were treated with 2.5 parts of an 8.5 percent solution of sodium methoxide in methanol the amount of methanol present being calculated to be sufficient to hydrolyse only 65 percent of the ester groups present. The mixture was stirred and heated to 35 to 40° C. for 5 hours in the absence of moisture. The mixture was thereafter allowed to stand for 16 hours at 20 to 22° C., 2.5 parts of glacial acetic acid added, and all material volatile up to 150° C. at 0.1 mm. pressure removed by distillation. In this way there were obtained 71.5 parts of partially hydrolysed poly(vinyl acetate) grafted siloxane/oxylkylene copolymer in the form of a pale yellow oil, the infrared spectrum of which confirmed the presence of both hydroxyl and acetoxy groups.

EXAMPLE 9

100 parts of a mixture of equal parts of the polyethers used in Examples 1 and 2 were reacted with 31 parts of the polysiloxane used in Example 1 in the presence of 0.8 parts of stannous octoate and 100 parts of dry toluene in the manner described in Example 1.

150 parts of the so-prepared polysiloxane/polyoxyalkylene copolymer were heated to 85 to 90° C. in an atmosphere of nitrogen and with constant stirring and 48.6 parts of freshly distilled vinyl acetate containing 0.8 part of dissolved dibenzoyl peroxide added dropwise thereto over a period of 30 minutes. The mixture was thereafter stirred for 2 hours at 90° C. after which all matter volatile up to 100° C. at 0.1 mm. pressure was removed by distillation. In this way there were obtained 192 parts of a homogeneous, clear, pale straw coloured viscous oil which contained 21.9 percent of grafted poly(vinyl acetate).

EXAMPLE 10

150 parts of the polysiloxane/polyalkylene copolymers of Example 9 were heated to 50 to 55° C. in an atmosphere of nitrogen, and with constant stirring 48 parts of freshly distilled vinyl acetate containing 1.5 parts of dissolved azodiisobutyronitrile added thereto over a period of one hour. The mixture was thereafter stirred for 24 hours at 50 to 55° C., after which all matter volatile up to 120° C. at 10 mm. pressure was removed by distillation. In this way there were obtained 187.5 parts of a hazy, pale straw coloured viscous oil which contained 20.0% of grafted poly(vinyl acetate).

EXAMPLE 11

50 parts of the poly(vinyl acetate) grafted polysiloxane/polyoxyalklene copolymer prepared in the manner described in Example 9 were dissolved in 79 parts of anhydrous methanol at 20° C. and 4.7 parts of an 8.5 percent solution of sodium methoxide in methanol added thereto, moisture being excluded. The mixture was stirred for 90 minutes at 22° C., then the temperature raised slowly to 50° C. over a period of 4 hours, with continued stirring. 0.5 part of glacial acetic acid were added to the mixture, methyl acetate and methanol were then distilled off at atmospheric pressure and final traces of the solvent were subsequently removed by distillation under reduced pressure at 100° C. There were thus obtained 44.5 parts of a very viscous white poly(vinyl alcohol) grafted polysiloxane/polyoxyalkylene copolymer, the infrared spectrum of which confirmed the presence of —OH groups and the absence of >C=O groups. The terpolymer was water-soluble.

EXAMPLE 12

A poly(vinyl acetate) grafted polysiloxane/polyoxyalkylene copolymer was prepared by the procedure described in Example 9 from 200 parts of the polysiloxane/polyoxyalkylene copolymer described therein and 200 parts of vinyl acetate, containing 1.5 parts of dissolved dibenzoyl peroxide as catalyst. After reaction 14.5 parts of unpolymerised vinyl acetate were recovered and there were obtained 385.5 parts of poly(vinyl acetate) grafted polysiloxane/polyoxyalkylene copolymer, containing 48.1 percent of poly(vinyl acetate).

EXAMPLE 13

100 parts of the grafted terpolymer prepared in the manner described in Example 12 were dissolved in 158 parts of anhydrous methanol and 15.8 parts of a 10.5 percent solution of sodium methoxide in methanol added thereto, moisture being excluded. The mixture was then stirred and heated to 35 to 45° C. for 5 hours. The mixture was then treated with 2.2 parts of glacial acetic acid, methyl acetate and methanol were distilled off at atmospheric pressure and final traces of the solvent removed by distillation under reduced pressure at 100° C. In this way there were obtained 72.6 parts of poly(vinyl alcohol) grafted polysiloxane/polyoxyalkylene copoylmer in the form of a pale yellow crumbly solid, containing 30.3 percent of grafted poly(vinyl alcohol). The polymer was water-soluble.

EXAMPLE 14

95 parts of a propylene oxide adduct of glycerol, of molecular weight 3000, 0.3 part of stannous octoate in 5 parts of the above propylene oxide adduct of glycerol and a solution of 0.1 part of triethylene diamine and 0.6 part of the terpolymer of Example 1 in 3.0 parts of water were thoroughly mixed with 39.5 parts of an 80:20 blend of the 2,4- and 2,6-isomers of tolylene di-isocyanate. The mixture was poured into an open top mould where foaming was completed in about 1½ minutes. After 30 minutes the foam was removed from the mould and found to have a fine, even open celled structure and density 2 lb./cu. ft.

EXAMPLE 15

A fine celled, resilient polyurethane foam of density 2 lb./cu. ft. was obtained when 0.6 part of the terpolymer of Example 2 was substituted for the same quantity of the terpolymer of Example 1 in the process described in Example 14.

EXAMPLE 16

A resilient polyurethane foam of fine, uniform cell structure was prepared by mixing together 100 parts of a propylene oxide adduct of glycerol of molecular weight 3000, 0.5 part of stannous octoate, 0.5 part of N,N-dimethylbenzylamine, 0.3 part of 4-(N,N-dimethylamino) pyridine, 3.0 parts of water, 39.5 parts of an 80:20 mixture of the 2,4- and 2,6-isomers of tolylene di-isocyanate and 1.0 part of the terpolymer of Example 5.

EXAMPLE 17

A fine celled, resilient polyurethane foam of density 1.65 lb./cu. ft. was prepared by mixing together 95 parts of a propylene oxide adduct of glycerol of molecular weight 3000, 0.3 part of stannous octoate in 5 parts of the above propylene oxide adduct of glycerol, a solution of 0.08 part of triethylene diamine and 1.0 part of the terpolymer of Example 4 in 4.0 parts of water, and 50 parts of an 80:20 mixture of the 2,4- and 2,6-isomers of tolylene di-isocyanate.

EXAMPLE 18

A fine celled, resilient polyurethane foam of density 1.65 lb./cu. ft. was obtained when 1.0 part of the terpolymer of Example 6 was substituted for the same quantity of terpolymer of Example 4 in the process described in Example 17.

EXAMPLE 19

A rigid polyurethane foam of fine, even texture and density 2.8 lb./cu. ft. and containing a high proportion of closed cells was prepared by mixing together 100 parts of oxypropylated trimethylolpropane of average molecular weight 315, 145 parts of crude 4,4'-di-isocyanatodiphenylmethane, 25 parts of trichloromonofluoromethane, 15 parts of tri(beta-chloroethyl) phosphate, 1 part of N,N-dimethylcyclohexylamine, 0.2 part of dibutyltin dilaurate and 1 part of the terpolymer of Example 9.

EXAMPLE 20

150 parts of an anhydrous polyether prepared by oxyalkylation of iso-octanol with a mixture containing 60 percent of the ethylene oxide and 40 percent of propylene oxide, and having a molecular weight of 1648, were stirred and heated to 80° C. in an atmosphere of nitrogen, 75 parts of vinyl butyrate containing 1 part of dibenzoyl peroxide dissolved therein were added thereto over a period of 1 hour. The mixture was then stirred and heated at 80–90° C. for 3 hours and for a further hour at 120° C. 9 parts of unreacted vinyl butyrate was removed by distillation whereby there were obtained 216 parts of a clear amber, viscous water soluble oily liquid containing 30.6 percent of grafted poly-(vinyl butyrate).

49 parts of the so-prepared poly(vinyl butyrate) grafted oxyalkylated iso-octanol were mixed with 55 parts of toluene and the mixture dried for 30 minutes by azeotropic distillation, the distilled solvent being returned to the mixture. 0.9 part of trifluoroacetic acid, 0.01 part of potassium hydroxide and 5.9 parts of an ethoxypolysiloxane of average general formula

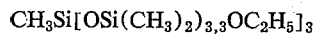

prepared by equilibration of methyltriethoxysilane and octamethylcyclotetrasiloxane in presence of potassium hydroxide as catalyst, were then added to the mixture. The mixture was heated under partial reflux with removal of the ethanol formed together with some toluene and addition of dry toluene to the mixture at an equivalent rate for 3 hours by which time the theoretical amount of ethanol had been evolved, 2.5 parts of sodium carbonate were then added to neutralise the acid catalyst, the mixture stirred for 15 minutes, cooled to 20° C. and filtered. The toluene was then removed by distillation at 15 mm. pressure to yield 54 parts of a yellow, viscous, liquid terpolymer.

EXAMPLE 21

A resilient polyurethane foam of even cell structure and density 1.7 lb./cu. ft. was obtained using 1.0 part of the terpolymer of Example 20 in place of the terpolymer of Example 4 in the process of Example 17.

EXAMPLE 22

49 parts of the poly(vinyl butyrate) grafted oxyalkylated iso-octanol usedi n Example 20 were diluted with 60 parts of toluene and the mixture dried for 30 minutes by azeotropic distillation with return of solvent to the mixture. The mixture was cooled to 50° C. and 3.0 parts of dry pyridine added, followed over a period of 15 minutes by 6.6 parts of a chloro-substituted polysiloxane containing 10.6 percent of silicon-bonded chlorine, and prepared by equilibration of phenyltrichlorosilane and octamethylcyclotetrasiloxane in presence of ferric chloride as catalyst. The mixture was stirred for 3 hours during which time the temperature was gradually raised to 100° C. after which it was cooled to 20° C. and allowed to stand at this temperature for 20 hours. The precipitated pyridine hydrochloride was then filtered off and the toluene removed by distillation at 15 mm. pressure up to a temperature of 100° C. There were thus obtained 55 parts of a pale brown, viscous, liquid terpolymer.

EXAMPLE 23

33 parts of a polyethylene oxide/polypropylene oxide block copolymer of average formula

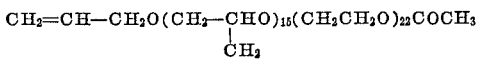

were stirred and heated at 80–90° C. in an atmosphere of nitrogen whilst a mixture of 33 parts of vinyl butyrate and 0.5 part of dibenzoyl peroxide was added thereto over a period of 30 minutes. Stirring and heating at 80–90° C. was continued for a further 4 hours, followed by 2 hours heating at 120° C. 3 parts of unreacted vinyl butyrate were removed from the reaction mixture by distillation to leave 63 parts of a clear, pale yellow, water insoluble product which contained 47.6 percent grafted poly(vinyl butyrate).

37 parts of the so-prepared poly(vinyl butyrate) grafted polyethylene oxide/polypropylene oxide block copolymer were diluted with 84 parts of toluene and the mixture dried for 30 minutes by azeotropic distillation with return of solvent to the mixture. 5.0 parts of the trimethylsilyl end-stopped polysiloxane fluid used in Example 1 were added followed by a cyclohexane complex of platinous chloride in amount sufficient to provide $5 \times 10^{-4}$ g. atom of platinum per g. atom of silicon-bonded hydrogen in the added polysiloxane, and 0.05 part of stannous octoate. The mixture was then heated under reflux for 4 hours after which the toluene was removed by distillation at 15 mm. pressure up to a temperature of 100° C. to yield 41 parts of a clear, brown, viscous, liquid terpolymer. The absence of $\equiv C = C \equiv$ bonds was confirmed by infrared spectroscopy.

EXAMPLE 24

150 parts of the anhydrous polyoxyalkylene polymer used in Example 20 were stirred and heated at 80–90° C. and a mixture of 47 parts of vinyl acetate, 28 parts of vinyl caprate and 1 part of dibenzyl peroxide added thereto over a period of 30 minutes. Stirring and heating at 80–90° C. was continued for 3 hours, followed by 1 hour at 120° C. 8 parts of a mixture of 64 percent vinyl acetate and 36 percent vinyl caprate were recovered by heating at 120° C. under a pressure of 0.1 mm. Hg. 217 parts of the graft copolymeric product were thus obtained as a clear yellow water soluble viscous oil $n_D^{25}$ 1.4608, containing 30.8 percent of grafted poly(vinyl esters).

49.1 parts of the so prepared poly(vinyl ester) grafted oxyalkylated iso-octanol were diluted with 60 parts of toluene and the mixture dried for 30 minutes by azeotropic distillation with return of dry solvent to the mixture. 0.7 part of stannous octoate was added followed over a period of 15 minutes by 10.3 parts of an organopolysiloxane oil of the average formula

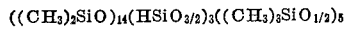

prepared by cohydrolysis of dimethyldichlorosilane, trichlorosilane and trimethylchlorosilane in excess water in the presence of diethyl ether and subsequent removal of the ether under reduced pressure and equilibration of the crude hydrolysate by heating with an acid activated clay.

The mixture was heated under reflux for 6 hours by which time the theoretical quantity of hydrogen had been evolved. The toluene solution was then cooled to 20° C., filtered and the toluene and volatile matter removed by distillation at 15 mm. pressure up to a temperature of 120° C. to yield 59 parts of a clear, brown, viscous, liquid terpolymer.

EXAMPLE 25

100 parts of an anhydrous mixed oxyalkylene polymer of average general formula

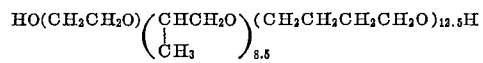

having an equivalent weight of 726 was heated at 80 to 90° C. and stirred whilst a mixture of 50 parts of vinyl butyrate and 1 part dibenzoyl peroxide was added dropwise over a period of 30 minutes. Stirring and heating at this temperature was continued for a further 2 hours, followed by 30 minutes heating at 120° C. 14 parts of vinyl butyrate were recovered by distillation under vacuum to give 135 parts of a clear, brown coloured, viscous liquid graft copolymer of $n_D^{25}$ 1.4610 which contained 25.9 percent of grafted poly(vinyl butyrate).

40.4 parts of the so prepared poly(vinyl butyrate) grafted mixed oxyalkylene polymer were diluted with 80 parts of toluene and the mixture dried for 30 minutes by azeotropic distillation with return of dry solvent to the mixture. 0.7 part of stannous octoate was added followed over a period of 15 minutes by 35.6 parts of an organopolysiloxane oil of the average formula

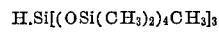

and the mixture heated under reflux for 7 hours by which time the theoretical quantity of hydrogen has been evolved. The mixture was then cooled to 20° C., filtered and the toluene and volatile matter removed by distillation at 15 mm. pressure up to a temperature of 110° C. to yield 75.5 parts of a clear, brown, viscous liquid terpolymer.

What we claim is:

1. Terpolymers consisting essentially of at least one polysiloxane block, at least one polyoxyalkylene block and at least one block selected from polyvinyl ester, partially and wholly hydrolyzed polyvinyl ester blocks.

2. Terpolymers according to claim 1 wherein the polyoxyalkylene blocks are of the general formula $(OC_nH_{2n})_x$ where $x$ is a positive integer and $n$ is an integer from 1 to 5.

3. Terpolymers according to claim 2 wherein $x$ is an integer of at least 5.

4. Terpolymers according to claim 2 wherein $n$ is an integer from 2 to 4.

5. Terpolymers according to claim 2 wherein at least 25 percent of the oxyalkylene units $n$ is 2.

6. Terpolymers according to claim 1 wherein the alkylene groups forming the polyalkylene block are selected from ethylene, 1,2-propylene, 1,3-propylene, 1,2-butylene and 1,4-butylene.

7. Terpolymers according to claim 1 wherein both ends of the polyoxyalkylene blocks are attached to a polysiloxane block.

8. Terpolymers according to claim 1 wherein one end of the polyoxyalkylene blocks is of the form OR where R is a hydrogen atom or a monovalent hydrocarbon or substituted hydrocarbon group.

9. Terpolymers according to claim 1 where one end of the polyoxyalkylene block is of the form COR', where R' is a monovalent hydrocarbon group.

10. Terpolymers according to claim 9 wherein R' is an alkyl group.

11. Terpolymers according to claim 10 wherein R' is a butyl or octyl group.

12. Terpolymers according to claim 1 wherein the organo groups of the polysiloxane blocks are hydrocarbyl or substituted hydrocarbyl groups.

13. Terpolymers according to claim 12 wherein the organo groups are selected from methyl, ethyl, propyl, butyl, phenyl, tolyl, naphthyl, cyclohexyl, vinyl, allyl and phenylethyl groups and groups derived therefrom by substitution with chlorine or bromine or with cyano, carboxy or amino groups.

14. Terpolymers according to claim 1 wherein the polysiloxane block is linked to a polyoxyalkylene block by a linkage selected from $$\equiv SiOOC\equiv, \quad \equiv SiR''OC\equiv, \quad Si\overset{\parallel}{R}OOC\equiv$$

where R'' is a divalent hydrocarbon group, $$\equiv SiR''COOC\equiv, \quad \equiv SiR'''CH(OH)CHR^4OC\equiv$$

where R''' is a divalent hydrocarbon or ether group and $R^4$ is an alkyl group, $\equiv SiRNHCOOC\equiv$ and $$\equiv SiRNHCONRC\equiv$$

where R is hydrogen or a monovalent hydrocarbon group.

15. Terpolymers according to claim 14 wherein the polysiloxane block is linked to a polyoxyalkylene block by a divalent organic group of the general formula $$\rightarrow (CH_2)_n-\ \text{or}\ -(CH_2)_{n-1}CO-$$

where $n$ is an integer from 1 to 20.

16. Terpolymers according to claim 15 where $n$ is an integer from 3 to 10.

17. Terpolymers according to claim 1 wherein the polyvinyl ester block is selected from polyvinyl acetate, polyvinyl propionate, polyvinyl butyrate, polyvinyl caprate and mixtures of two or more of these.

18. A process for the production of terpolymers as claimed in claim 1 wherein a polyoxyalkylene polymer is heated with a vinyl ester in the presence of a free radical-producing catalyst and the product thereafter reacted with a polysiloxane.

19. A process for the production of terpolymers as claimed in claim 1 wherein a polyoxyalkylene/polysiloxane copolymer is heated with a vinyl ester in presence of a free radical-producing catalyst.

20. A process according to claim 19 wherein the catalyst is dibenzoyl peroxide or $\alpha\alpha'$-azo-bis-isobutyronitrile.

21. A process for the production of terpolymers as claimed in claim 1 wherein a polysiloxane containing a proportion of silicon-bonded hydrogen atoms is reacted with a polyoxyalkylene/polyvinyl ester graft copolymer containing at least one hydroxyl group.

22. A process according to claim 21 wherein the hydroxyl group is in the polyoxyalkylene portion.

23. A process according to claim 21 wherein the reaction is carried out at a temperature of from 20 to 150° C.

24. A process according to claim 21 wherein a catalyst selected from stannous octoate, lead octoate and dibutyl tin dilaurate is used.

25. A process for the production of terpolymers as claimed in claim 1 wherein a polysiloxane containing at least one silicon-bonded halogen atom is reacted with a hydroxyl-containing polyoxyalkylene/polyvinyl ester graft copolymer.

26. A process according to claim 25 wherein the reaction is carried out in presence of a hydrogen halide acceptor selected from pyridine, triethylamine, urea and thio-urea.

27. A process according to claim 25 wherein the reaction is carried out at a temperature within the range from 20 to 150° C.

28. A process for the production of terpolymers as claimed in claim 1 wherein a polysiloxane containing silicon-bonded alkoxy or aroxy groups is reacted with hydroxyl-containing polyoxyalkylene/polyvinyl ester graft copolymer.

29. A process for the production of terpolymers as claimed in claim 15 wherein a polysiloxane containing at least one reactive group is reacted with a polyoxyalkylene/polyvinyl ester graft copolymer containing at least one hydroxyl group.

30. A process according to claim 29 wherein the reactive group in the polysiloxane is $\equiv SiR''X$ wherein R'' is a divalent hydrocarbon group and X is a halogen atom and the polysiloxane is reacted with an alkali metal salt of an hydroxyl-containing polyoxyalkylene/polyvinyl ester graft copolymer.

31. A process according to claim 28 wherein the polysiloxane contains one or more $\equiv SiR'COOR^5$ or $$\equiv SiR''COX$$

groups where $R^5$ is a monovalent organic group and R'' and X are as hereinbefore defined.

32. A process according to claim 29 wherein the hydroxyl groups are attached to the polyalkylene portion of the graft copolymer.

33. A process for the production of terpolymers as claimed in claim 15, wherein a polysiloxane containing one or more silicon-bonded hydrogen atoms is reacted with an unsaturated ester or ether derivative of a polyoxyalkylene/polyvinyl ester graft copolymer.

34. A process according to claim 33 wherein the unsaturated group is attached to the polyoxyalkylene portion.

35. A process according to claim 33 wherein a platinum-containing catalyst is used.

36. A process for the production of terpolymers as claimed in claim 1 wherein a vinyl ester is reacted with a polysiloxane/polyoxyalkylene copolymer.

37. A process according to claim 36 wherein the vinyl ester is vinyl acetate.

38. A process according to claim 18 including the step of hydrolysis or alcoholysis of the polysiloxane/polyoxyalkylene/polyvinyl ester copolymer.

39. A process according to claim 38 wherein methanol or ethanol is used for alcoholysis.

References Cited

UNITED STATES PATENTS

| | | | |
|---|---|---|---|
| 2,846,458 | 8/1958 | Haluska | 260—448.2 |
| 2,958,707 | 11/1960 | Warrick | 260—448.2 |
| 2,959,569 | 11/1960 | Warrick | 260—46.5 |
| 3,033,841 | 5/1962 | Germain | 260—89.1 XR |
| 3,133,111 | 5/1964 | Wheeler | 260—448.8 |
| 3,170,894 | 2/1965 | Brown et al. | 260—46.5 |
| 3,189,549 | 6/1965 | Emrick et al. | 252—52 XR |
| 3,299,112 | 1/1967 | Bailey | 260—448.2 |
| 3,305,504 | 2/1967 | Huntington | 260—29.2 XR |
| 3,342,766 | 9/1967 | Huntington | 260—29.6 XR |

TOBIAS E. LEVOW, Primary Examiner

P. F. SHAVER, Assistant Examiner

U.S. Cl. X.R.

117—124; 252—351, 357; 260—2.5, 46.5, 448.8, 824, 825, 827